United States Patent [19]
Sion et al.

[11] Patent Number: 5,131,433
[45] Date of Patent: Jul. 21, 1992

[54] APPARATUS FOR BLOCKING FLUID FLOW THROUGH A CONDUIT

[76] Inventors: Karl Sion, Halfendriesch 4; Dieter Wirtz, Krebstrasse 74, both of D-5100 Aachen, Fed. Rep. of Germany

[21] Appl. No.: 641,009

[22] Filed: Jan. 14, 1991

[51] Int. Cl.⁵ .............................................. F16L 55/12
[52] U.S. Cl. ......................................... 138/93; 138/89; 138/90
[58] Field of Search ............................. 138/89, 90, 93; 220/239; 73/49.1

[56] References Cited

U.S. PATENT DOCUMENTS

| | | | |
|---|---|---|---|
| 1,906,151 | 4/1933 | Goodman | 138/93 |
| 1,946,138 | 2/1934 | Gardner | 138/93 |
| 2,843,154 | 7/1958 | Hosking | 138/93 |
| 3,724,273 | 4/1973 | Awrey | 138/93 |
| 3,870,085 | 3/1975 | Schneider | . |
| 3,890,994 | 6/1975 | Olsen | . |
| 4,021,265 | 5/1977 | Guenther | 138/93 |
| 4,329,132 | 5/1982 | Melvold et al. | 220/239 |
| 4,390,333 | 6/1983 | Dubois | 220/239 |
| 4,550,751 | 11/1985 | Shimamura et al. | 138/93 |
| 4,609,042 | 9/1986 | Broadus et al. | 220/239 |
| 4,614,281 | 9/1986 | Wright | 220/239 |

FOREIGN PATENT DOCUMENTS

| | | | |
|---|---|---|---|
| 854297 | 7/1949 | Fed. Rep. of Germany | 138/93 |
| 2812533 | 10/1979 | Fed. Rep. of Germany | 138/93 |
| 2617572 | 6/1987 | France | . |
| 20301 | 5/1907 | United Kingdom | 138/93 |

Primary Examiner—James E. Bryant, III
Attorney, Agent, or Firm—Shefte, Pinckney & Sawyer

[57] ABSTRACT

An apparatus for blocking the flow of fluid through a conduit such as a sewer inlet or the like is provided. The flow-blocking apparatus includes an expandable bladder, a compressed-gas source for supplying compressed gas to effect expansion of the bladder, and a handle device for supporting the compressed-gas source while the bladder is positioned in the conduit to be blocked. The handle device is configured to permit an operator to actuate the flow of compressed gas to the bladder while continuing to support the compressed-gas source. The handle device preferably includes a base portion, a movable portion pivotable relative to the base portion and an actuating member movable in response to pivoting of the movable piston for controlling the flow of compressed gas from the compressed-gas source to the bladder. The apparatus also includes a burst protection plate which deflects compressed gas escaping from the bladder to thereby prevent any injury to an operator.

5 Claims, 1 Drawing Sheet

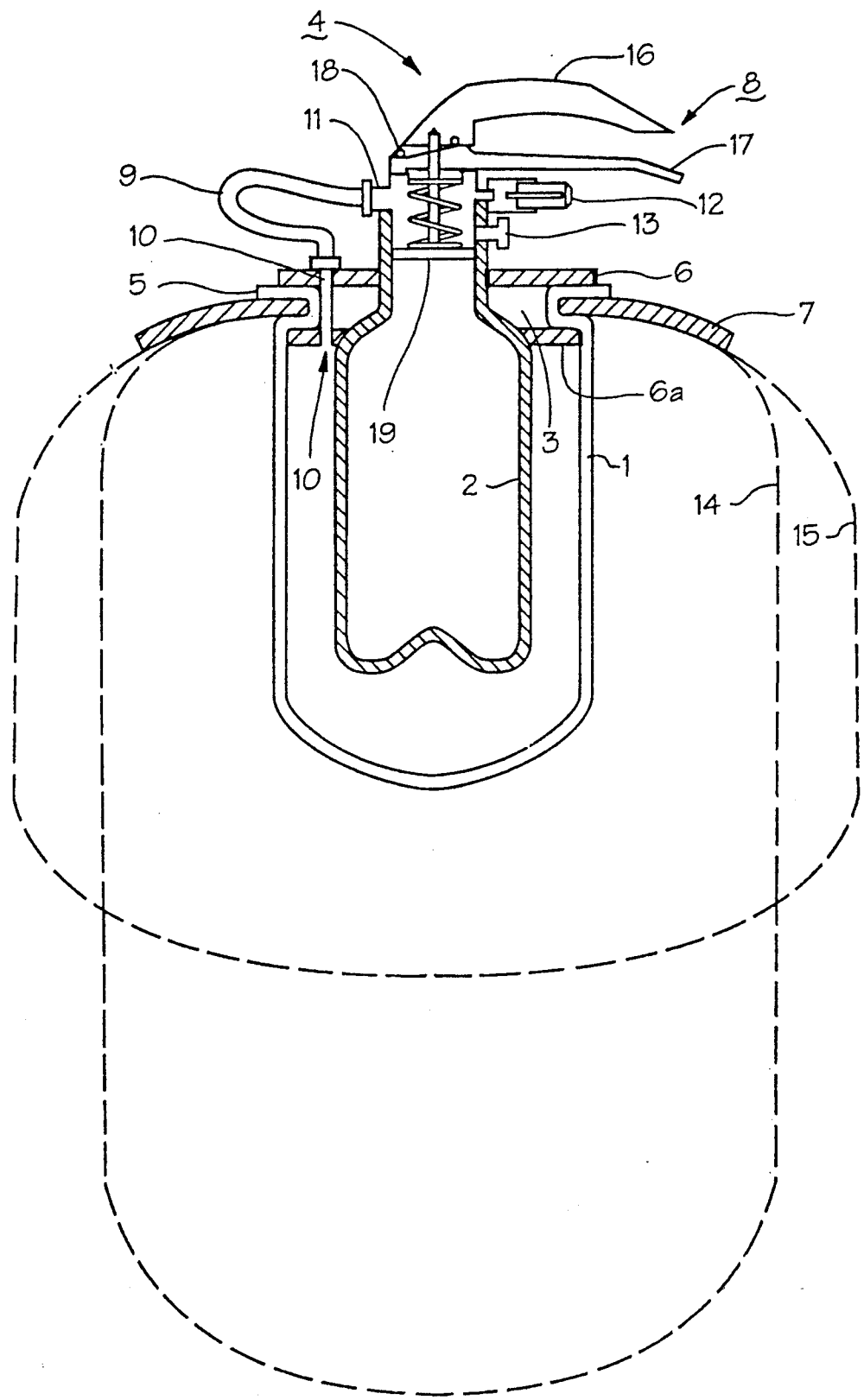

APPARATUS FOR BLOCKING FLUID FLOW THROUGH A CONDUIT

BACKGROUND OF THE INVENTION

The present invention relates an improved sealing system for sewer lines, shafts, pipes, and the like, the sealing system being of the type which includes an elastic inflatable body having an opening that encloses a compressed-gas connector that is integrated therein so as to be air-tight.

To seal off water inlets and sewer shafts in road or industrial lands in the event of mishaps, e.g., in cases of chemical spills or outflowing crude-oil products, it is known to provide a deflated sealing bladder or balloon into the sewer shaft and then inflating the bladder from a source of compressed gas so that the sewer inlet can be closed off until such time as any danger has been eliminated. Cylinders of compressed air, $CO_2$ cartridges, or the like can be used as sources of compressed gas. In practice, a plurality of such leaks or discharges frequently have to be sealed off simultaneously and each sealing bladder has to have its own associated source of compressed air. Thus, generally speaking, at least two persons will be required to manage the whole system. In addition, a relatively large amount of storage space will be required for the sealing system, e.g., in a fire-fighting vehicle.

In order to simplify handling of a sealing bladder device, it is know to provide a compressed-gas capsule that is to be opened by way of a plug-type adapter. However, the bladder can typically only be used at a maximum volume, and thus cannot be adapted to a particular requirement. In this case, too, two separate components, namely, the inflatable bladder and the compressed-gas capsule, have to be held in the sewer shaft so that the operator has to work bent over and with both hands involved in supporting the two separate components.

Accordingly, the need exists for improvements in a sealing system of the type for storm sewers, sewer shafts or the like, in roads, in industrial parks, on airfields and the like, which can be positioned optimally in a particular channel or the like, and which can be activated, which is to say inflated, such that the operator can support himself or herself with one hand on the ground during the sealing-off operation.

SUMMARY OF THE INVENTION

Briefly described, the present invention provides an apparatus for substantially blocking the flow of fluid along a conduit having a continuous inner surface. The apparatus includes means for sealingly engaging the inner surface of the conduit along a sealing location to substantially prevent the passage of fluid across the sealing location, the sealingly engaging means including a bladder expandable between an unexpanded condition in which it is out of sealing engagement with the conduit and an expanded condition in which it is in sealing engagement with the inner surface of the conduit at the sealing location. The apparatus also includes a compressed-gas source connected to the bladder for supplying compressed gas thereto to effect expansion of the bladder from its unexpanded condition to its expanded condition. Additionally, the apparatus includes handle means connected to the sealingly engaging means, the handle means being configured for hand engagement by an operator for deployment of the sealingly engaging means to a deployed disposition in which the bladder, in its unexpanded condition, is positioned in the conduit for subsequent expansion into sealing engagement with the inner surface of the conduit. The handle means is interconnected with the compressed-gas source to permit the operator to support the compressed-gas source while the bladder is positioned for subsequent expansion into sealing engagement and the handle means includes an actuating mechanism, operatively connected to the compressed-gas source, for controlling the supply of compressed gas to the bladder.

According to one aspect of the present invention, the actuating mechanism is manipulable between a non-actuating position in which it prevents the supply of compressed gas to the bladder and an actuating position in which the supply of compressed gas to the bladder is permitted and the handle means is configured to allow an operator to simultaneously support the compressed-gas source and manipulate the actuating mechanism to its actuating position with one hand engagement of the handle means.

According to one variation of the apparatus of the present invention, there is provided means for adjustably controlling the rate of flow of the compressed gas being supplied from the supply of compressed gas to the bladder, the flow rate controlling means being adjustable to selectively increase and decrease the rate of flow of the compressed gas which is supplied to the bladder when the actuating member is in its actuating position.

According to another variation of the apparatus of the present invention, there is provided means forming a conduit having a pair of opposed ends, the conduit being movable from a normal connecting position in which one opposed end is connected to the bladder and the other opposed end is connected to the compressed-gas source for introducing compressed gas through the conduit from the compressed-gas source to the bladder and a disconnect position in which the one opposed end of the conduit is disconnected from the bladder, wherein the one opposed end of the conduit can be selectively connected to the bladder of another fluid-blocking apparatus for introducing compressed gas thereto or operated as an inlet conduit for introducing compressed gas to the compressed-gas source.

In the one aspect of the present invention, the handle means preferably includes a base portion fixedly mounted to the compressed-gas source and a movable position movable relative to the base portion, the actuating member being operatively interconnectable to the movable portion of the handle means for movement therewith and the movable portion being movable relative to the base portion to effect movement of the actuating member from its non-actuating position to its actuating position. Also, the compressed-gas source preferably includes an outlet opening having an axis, and the actuating member preferably includes a valve portion movable along the axis of the outlet opening between a closed position in which it prevents the passage of compressed gas through the outlet opening and an open position, axially spaced from the closed position, in which the valve portion does not block the passage of compressed gas through the outlet opening and means for biasing the valve portion into its closed position, the movable portion of the handle means being operable to move the valve portion against the bias of the biasing means to effect movement of the valve position from its closed portion to its open position. In another aspect of the present invention, there is provided an apparatus for substantially blocking the flow of fluid along a conduit having a continuous inner surface. The apparatus includes a compressed gas source and means for sealingly engaging the inner surface of the conduit along a sealing location to substantially prevent the passage of fluid across the sealing location. The sealingly engaging means includes a bladder expandable between an unexpanded condition in which it is out of sealing engagement with the conduit and an expanded condition in which it is in sealing engagement with the inner surface of the conduit at the sealing location.

The bladder includes an open end portion forming an open end of the bladder. The sealingly engaging means also includes means forming an opening, the opening being configured for receiving the compressed-gas source in sealing engagement therein with a portion of the compressed-gas source extending interiorly of the bladder and means for interconnecting the compressed-gas source and the bladder for the supply of compressed gas to the bladder to effect expansion of the bladder for its unexpanded condition to its expanded condition.

Furthermore, in the another aspect of the present invention, the apparatus includes means, mounted to the portion of the compressed-gas source extending interiorly of the bladder, for releasably compressively engaging the open end portion of the bladder, the releasably compressively engaging means being operable to releasably secure the open end portion of the bladder therebetween with a compressive force selected to be overcome when the pressure of the compressed gas in the bladder exceeds a predetermined value. Also, the apparatus includes means, disposed adjacent the releasably compressively engaging means, for deflecting in a selected direction the compressed gas which is released from the bladder when the open end portion of the bladder is released from its compressive engagement by the releasably compressive engaging means due to a pressure in the bladder in excess of the predetermined value.

DETAILED DESCRIPTION OF THE PREFERRED EMBODIMENT

The present invention provides a sealing system which comprises an elastic inflatable body that incorporates an opening with a compressed-gas connector integrated therein so as to be air-tight, such that the inflatable body encloses a compressed-gas container that is to be connected with the compressed-gas connector, and a carrying handle.

The sealing system thus advantageously consists of a single components, can preferably be positioned with one hand, which grasps the carrying handle, and then activated by compressed gas. The charging of the compressed gas can be effected by operating a valve (with the hand that is supporting the system), e.g., by pressing on a knob, by moving a lever, or by a pincer-like movement.

In order to match the volume of the activated inflated body to a particular requirement, the present invention contemplates that a gas-metering system, preferably manually operated, can be incorporated in the connection between the compressed-gas container and the inflated body. Then, with the one hand that sets the sealing system in the channel, the operator can not only position the inflatable body correctly, but can also adjust the volume of the inflated body to the size that appears to be most appropriate. In this manner of employing a sealing system, manipulation is simplest if the gas-metering system is connected rigidly to the compressed-gas container and if the carrying handle is also secured to this connection or coupling.

According to another aspect of the present invention, a pipe is arranged outside the inflatable body and is releasably couplable with the connector of the gas-metering system such that the gas-metering system can, if desired, be used to fill other compressed-gas containers or to fill other inflatable bodies. This results in a type of building-block system because the compressed-gas container that is contained within the inflatable body is used both to activate the inflatable body itself as well as to inflate other sealing bladders or the like that are kept in readiness for special circumstances. In this connection, it is also advantageous to use the gas-metering system not only as an outlet valve, but also as an inlet valve for the compressed-gas container, and for it to be configured so that it can be appropriately switched over for refilling the compressed-gas container.

To protect the operator from injury should the inflatable body burst, a further embodiment of the present invention provides a peripheral edge portion which defines an opening of the inflatable body, which is configured for insertion of the compressed-gas container. The edge portion is clamped between a retaining plate that is connected to the compressed-gas container so as to provide support therefor and a burst protection plate that lies directly on the inflatable body and encircles the opening as a ring or collar with the clamping force at the opening being smaller than the bursting force of the inflatable body. In the case of a pressure overload, the clamping effect on the inner periphery of the burst protector plate will be released and the escaping compressed gas will be deflected away from the operator's hands by the burst protector plate and the retaining plate. To this end, the edge of the opening of the inflatable body should be folded from inside to outside around the inner periphery of the plate and be clamped on the outer side of the plate that is remote from the inflatable body with the help of the retaining plate. Then, prior to a burst, the edge of the opening of the sealing body defeats the clamping effort and slides on the side of the burst protection plate that is remote from the hand.

In practice, a backing plate is needed for such a solid attachment and clamping of the edge portion of the inflatable body opening, this then working in conjunction with the retaining plate. It is preferable that the backing plate be rigidly joined (i.e., by adhesion) to the compressed-gas container and that the retaining plate axially movable relative to the metering system. The edge portion of the inflatable body opening that is arranged around the inner periphery of the burst protection plate can then be secured by screws, for instance, between the retaining plate and the backing plate. The gas inlet of the inflatable body which is coupled through the gas-metering system with the compressed-gas container, extends generally through the retaining plate and the backing plate.

In one aspect of the present invention, the inflatable body is approximately spherical when inflated. However, it may be difficult to draw off the liquid that collects on the periphery of the sphere. In this situation, it is more advantageous if the inflatable body is of a shape that is substantially cylindrical when inflated. This results in a particularly effective seal because a cylindrically extended shape will result when it is in the inflated state. However, in the case of short sewer inlets, it can also be advantageous if the shape of the inflated inflatable body is cylindrically disk-shaped. If the sewer that is to be sealed off is of rectangular or quadratic cross-section, it is preferable to insert an inflatable body that assumes a substantially rectangular or quadratic shape on its own when in the activated state.

The preferred embodiment of the fluid-blocking apparatus of the present invention is illustrated in the sole figure of the drawings. The fluid-blocking apparatus is operable to substantially block the flow of fluid along a conduit (not shown) such as, for example, a type of sewer system. The fluid-blocking apparatus includes means for sealing engaging the inner surface of a conduit along a sealing location to substantially prevent the passage of fluid across the sealing location. The sealing engaging means includes an inflatable body or bladder 1 comprised of a flexible, stretchable material such as, for example, an elastomeric material. The bladder 1 is expandable between an expanded condition in which it is expanded into sealing engagement with the inner surface of the conduit at the sealing location and an unexpanded condition in which it is outer sealing engagement with the inner surface of the conduit at the sealing location and an unexpanded condition in which it is outer sealing engagement with the conduit. The bladder 1 includes an open end defined by a circumferential edge portion 5.

A compressed-gas source for supplying compressed gas to the bladder 1 is provided in the form of a rigid compressed-gas container 2 having a generally elongate cylindrically shaped body portion and a cylindrical neck portion of reduced diameter relative to the body portion. An annularly shaped backing plate 6a includes an inner annular opening comparably configured with the outer diameter of the rigid compressed-gas container 2 for receiving the container therein The backing plate 6a is secured by conventional securing means such as, for example, welding, to the rigid compressed-gas container 2.

The rigid compressed-gas container 2 is received within the bladder 1 and the circumferential edge portion 5 of the bladder 1 is releasably fixedly secured relative to the rigid compressed-gas container 2 by a compression arrangement which includes a retaining plate 6 and a burst protection plate 7. The retaining plate 6 is annularly shaped and includes an inner annular opening for receiving the reduced diameter neck portion of the rigid compressed-gas container 2 therein. The retaining plate 6 is secured to the reduced diameter neck portion of the rigid compressed-gas container 2 by appropriate securement means such as, for example, by welding, and is parallel to and spaced from the backing plate 6a relative to the axis of the rigid compressed-gas container 2.

The burst protection plate 7 is in the form of a collar having an annular inner opening of a diameter relatively greater than the diameter of the rigid compressed-gas container 2. The burst protection plate 7 tapers arcuately from its inner annular opening to its outer circumferential edge in the direction away from the retaining plate 6.

The diameter of the inner annular opening of the burst protection plate 7 is relatively less than the diameter of the outer circumference of the backing plate 6a and the retaining plate 6. The burst protection plate 7 is disposed intermediate the retaining plate 6 and the backing plate 6a relative to the axis of the rigid compressed-gas container 2 and the circumferential edge portion 5 of the bladder 1 is disposed in overlapping manner about the inner annular opening of the burst protection plate 7 such that the circumferential edge portion 5 is compressively engaged both between the retaining plate 6 and the burst protection plate 7 and between the backing plate 6a and the burst protection plate 7.

The reduced diameter neck portion of the rigid compressed-gas container 2 defines an outlet opening for guiding the flow of compressed gas out of the rigid compressed-gas container 2. A gas-metering device 8 is mounted to the reduced diameter neck portion of the rigid compressed gas container 2 for controlling the rate of flow of the compressed gas being supplied from the rigid compressed gas being supplied from the rigid compressed-gas container 2 to the bladder 1. The gas-metering device 8 includes a conventional safety shut-off component 12 operable to stop the flow of compressed gas from the rigid compressed-gas container 2 in response to the occurrence of an out-of-limits pressure situation such as, for example, a situation in which the pressure of the gas exiting the compressed-gas container 2 exceeds a predetermined limit. The gas-metering device 8 also includes a conventional flow rate monitoring component 13 in the form of, for example, a manometer, which is operable to provide information concerning the flow rate of gas exiting the rigid compressed gas container 2.

The gas-metering device 8 is connected via a connector 11 to a directional conduit 9 which is preferably in the form of a flexible tube having one opposed end connected to a connector 11 of the gas-metering device 8 and another opposed end connected to a cylindrical tube 10. The cylindrical tube 10 extends through a compatibly configured opening in the retaining plate 6 and a compatibly configured opening in the backing plate 6a. The cylindrical tube 10 is sealingly mounted with respect to the retaining plate 6 and the backing plate 6a. The conduit 9 and the cylindrical tube 10 cooperate together to guide compressed gas from the rigid compressed-gas container 2 to the interior of the bladder 1. The conduit 9 is releasably connected to the cylindrical tube 10 to permit the ready release of the conduit 9 from the cylindrical tube so that, for example, the conduit 9 can be connected to the bladder of another fluid-blocking apparatus for the delivery of compressed gas from the rigid compressed-gas container 2 to the bladder of the other fluid-blocking apparatus or connect to a re-supply device (not shown) for re-supplying compressed gas to the rigid compressed-gas container 2. The rigid compressed-gas container 2 is filled with a compressed gas which can be, for example, air or any other suitable inert gas.

The fluid-blocking apparatus also includes handle means 4 configured for hand engagement by an operator for deployment of the sealingly engaging means including the bladder 1 to a deploy disposition in which the bladder 1, in its unexpanded condition, is positioned in a conduit for subsequent expansion into sealing engagement with the inner surface of the conduit. The handle means includes a base portion 17 in the form of a rigid member extending transversely relative to the axis of the compressed-gas container 2 and secured to the top end of the gas-metering device 8. The handle means 4 also includes a movable portion 16 having an arcuate shape and being pivotably connected by a pivot 18 to the base portion 17 for pivoting about an axis transverse to the axis of the rigid compressed gas container 2.

The handle means 4 also includes an actuating member 19 for controlling the supply of compressed gas from the rigid compressed-gas container 2 to the bladder 1. The actuating member 19 includes an annular stopper disk having a diameter selected with respect to the inner diameter of the reduced diameter neck portion of the rigid compressed-gas container 2 such that the annular stopper disk, in a flow-blocking position, is in sealing engagement with the neck portion to prevent the flow of compressed gas there past. The actuating member 19 also includes a stem portion coaxially fixedly mounted to the annular stopper disk and extending along the axis thereof, and a biasing means in the form of a spring for biasing the annular stopper disk in its flow-blocking position.

The biasing means spring is disposed coaxially on the stem portion of the actuating member 19 and extends between the annular stopper disk and an abutment shoulder formed on the base portion 17. The length of the stem portion of the actuating member 19 is selected such that its free end extends beyond the base portion 17 relative to the axis of the rigid compressed-gas container 2 when the biasing means spring biases the annular stopper disk into its flow-blocking position in which the annular stopper disk is disposed in sealing engagement with the reduced diameter neck portion of the rigid compressed-gas container 2 for blocking the flow of compressed gas from the rigid compressed container.

The free end of the stem portion of the actuating member 19 is engaged by the movable portion 16 during pivoting of the movable portion in a direction toward the base portion 17 to effect axial displacement of the actuating member 19 relative to the rigid compressed container 2. During its pivoting movement toward the base portion 17, the movable portion 16 sufficiently axially displaces the actuating member 19 to move the annular stopper disk interior of the rigid compressed-gas container 2 beyond its reduced diameter neck portion so that the annular stopper disk is no longer is sealing engagement with the neck portion. In this disposition of the annular stopper disk, compressed gas flows around the stopper disk and exits the rigid compressed gas container 2 and flows through the conduit 9 and the cylindrical tube 10 into the bladder 1 to effect inflation of the bladder 1.

In operation, an operator engages the handle means 4 with selected ones of the operator's hands. For example, an operator may engage the handle means 4 with a single hand or with both hands. The operator then deploys the fluid-blocking apparatus in a conduit in which the flow of fluid is to be blocked, positioning the fluid-blocking apparatus so that the bladder 1, which is in its normal, unexpanded condition, is disposed for subsequent expansion into sealing engagement with the inner surface of the conduit at a sealing location at which the fluid flow is to be blocked. The operator engages the handle means 4 by extending the fingers of his or her selected one hand (or hands) in gripping manner around the base portion 17 and the movable portion 16. As the operator positions the fluid-blocking apparatus in a conduit, the operator supports the rigid compressed-gas container 2 so that the container is not impacted by or supported on the conduit.

Once the fluid-blocking apparatus has been positioned in the conduit and the operator desires to implement the fluid-blocking action of the apparatus, the operator simultaneously moves the actuating member 19 to its flow-permitting actuating position while continuing to support the rigid compressed-gas container 2. Specifically, the operator moves the movable portion 16 with the operator's selected one hand (or with at least one of the operator's selected hands) which is in hand engagement with the handle means 4 such that the movable portion 16 is moved toward the base portion 17. This pivoting movement of the movable portion 16 effects axial displacement of the actuating member 19 from its non-actuating position in which it is in sealing engagement with the next portion of the rigid compressed container 2 to its actuating position in which gas flows around the actuating member, through the conduit 9 and the cylindrical tube 10 and into the interior of the unexpanded bladder 1. As the compressed gas continues to fill the interior of the bladder 1, the bladder extends to its expanded condition such as shown by the solid line 14, thereby sealingly engaging the inner surface of the conduit and blocking the flow of fluid through the conduit beyond the fluid-blocking apparatus.

When the bladder 1 is in its expanded condition as shown by the solid line 14, the bladder has an essentially elongate cylindrical shape which is particularly effective for resisting the flow therepast of fluid such as, for example, oil, acid, or other caustic fluids. In the event that the conduit to be blocked has as only a relatively short axial length such as, for example, a sewer inlet, it can be beneficial to configure the bladder 1 such that the bladder assumes a generally discoid shape in its expanded condition, such as shown by the broken lines 15.

Once the bladder 1 is fully inflated to its expanded condition, the operator releases the force on the movable portion 16 to permit the biasing means spring to retract the actuating member 19 to its fluid-blocking non-actuating position. As the actuating member 19 moves from its actuating to its non-actuating position, the free end of the stem portion thereof effects pivoting of the movable portion 16 away from the base portion 17.

To prevent injury to the operator, the compressive force by which the bladder 1 is engaged between the retaining plate 6, the burst protection plate 7, and the backing plate 6a is selected such that this compressive force will be overcome when the pressure of the gas in the bladder 1 exceeds a predetermined limit which is lower than the limit at which the bladder itself will catastrophically burst. This insures that the compressive engagement of the circumferential edge portion 5 will fail before the bladder 1 catastrophically bursts or explodes. Instead, as the pressure of the gas in the bladder 1 exceeds the predetermined limit, the continued expansion of the bladder 1 effects displacement of the circumferential edge portion 5 from its compressive engagement between the retaining plate and the burst protection plate 7 and, subsequently, form its compressive engagement between the burst protection plate 7 and the backing plate 6a. As the circumferential edge portion 5 is moved free of its compressive engagement between the burst protection plate 7 and the backing plate 6a, the compressed gas in the bladder 1 escapes in the opening created between the now released circumferential edge portion 5 and the burst protection plate 7 there above. In this instance, the burst protection plate 7 effectively blunts any potentially injurious effect of the escaping compressed gas which is moving at a relatively high speed and thereby protects the operator from injury.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An apparatus for substantially blocking the flow of fluid along a conduit having a continuous inner surface, comprising:
    means for sealingly engaging the inner surface of the conduit along a sealing location to substantially present the passage of fluid across the sealing location, the sealing engaging means including a bladder expandable between an unexpanded condition in which it is out of sealing engagement with the conduit and an expanded condition in which it is in sealing engagement with the inner surface of the conduit at the sealing location;
    a compressed-gas source connected to the bladder for supplying compressed gas thereto to effect expansion of the bladder from its unexpanded condition to its expanded condition; and
    a handle assembly connected to the sealingly engaging means, the handle assembly being configured for hand engagement by an operator for deployment of the sealingly engaging means to a deployed disposition in which the bladder, in its unexpanded condition, is positioned in the conduit for subsequent expansion into sealing engagement with the inner surface of the conduit and the handle assembly being interconnected with the compressed-gas source to permit the operator to support the compressed-gas source while the bladder is positioned for subsequent expansion into sealing engagement, the handle assembly including a base portion fixedly mounted to the compressed-gas source and a movable portion movable to the base portion and an actuating mechanism, operatively connected to the compressed-gas source and the movable portion, for controlling the supply of compressed gas to the bladder, the movable portion being movable relative to the base portion to effect movement of the actuating mechanism between a non-actuating position in which it prevents the supply of compressed gas to the bladder and an actuator position in which the supply of compressed gas to the bladder is permitted, and the handle assembly being configured to allow an operator to simultaneously support the compressed-gas source and manipulate the actuating mechanism to its actuating position with one hand engagement of the handle assembly.

2. The apparatus according to claim 1 and characterized further by means for adjustably controlling the rate of flow of the compressed gas being supplied from the supply of compressed gas to the bladder, the flow rate controlling means being adjustable to selectively increase and decrease the rate of flow of the compressed gas which is supplied to the bladder when the actuating member is in its actuating position.

3. The apparatus according to claim 1 and characterized further by a conduit element having a pair of opposed ends and a hallow interior, the conduit element being movable from a normal connecting position in which one opposed end is connected to the bladder and the other opposed end is connected to the compressed-gas source for introducing compressed gas through the conduit element form the compressed-gas source to the bladder and a disconnect position in which the one opposed end of the conduit element is disconnected from the bladder, wherein the one opposed end of the conduit element can be selectively connected to the bladder of another fluid-blocking apparatus for introducing compressed gas thereto or operated as an inlet conduit for introducing compressed gas to the compressed-gas source.

4. The apparatus according to claim 1 and characterized further in that the compressed-gas source includes an outlet opening having an axis, and the actuating member includes a valve portion movable along the axis of the outlet opening between a closed position in which it prevents the passage of compressed gas through the outlet opening and an open position, axially spaced from the closed position, in which the valve portion does not block the passage of compressed gas through the outlet opening and means for biasing the valve portion into its closed position, the movable portion of the handle assembly being operable to move the valve portion against the bias of the biasing means to effect movement of the valve position from its closed position to its open position.

5. An apparatus for substantially blocking the flow of fluid along a conduit having a continuous inner surface, comprising:
    a compressed gas source;
    means for sealingly engaging the inner surface of the conduit along a sealing location to substantially prevent the passage of fluid across the sealing location, the sealingly engaging means including a bladder expandable between an unexpanded condition in which it is out of sealing engagement with the conduit and an expanded condition in which it is in sealing engagement with the inner surface of the conduit at the sealing location, the bladder including an open end portion forming an open end of the bladder having an opening therein, the open end portion being configured for receiving the compressed-gas source through the opening with the compressed-gas source in sealing engagement with the open end portion and a portion of the compressed-gas source extending interiorly of the bladder and means for interconnecting the compressed-gas source and the bladder for the supply of compressed gas to the bladder to effect expansion of the bladder from its unexpanded condition to its expanded condition;
    means, mounted to the portion of the compressed-gas source extending interiorly of the bladder, for releasably compressively engaging the open end portion of the bladder, the releasably compressively engaging means being operable to releasably secure the open end portion of the bladder therebetween with a compressive force selected to be overcome when the pressure of the compressed gas in the bladder exceeds a predetermined value; and means, disposed adjacent the releasably compressively engaging means, for deflecting in a selected direction the compressed gas which is released from the bladder when the open end portion of the bladder is released from its compressive engagement by the releasably compressive engaging means due to a pressure in the bladder in excess of the predetermined value.

* * * * *